April 7, 1953　　　W. O. McINTYRE ET AL　　　2,634,141
OIL SEAL
Filed Oct. 25, 1950

Inventors
William O. McIntyre
Harold V. Lundquist
By John N. Randolph
Attorney

Patented Apr. 7, 1953

2,634,141

UNITED STATES PATENT OFFICE 2,634,141

OIL SEAL

William O. McIntyre and Harold V. Lundquist, Orlando, Fla.

Application October 25, 1950, Serial No. 192,122

5 Claims. (Cl. 286—5)

This invention relates to an improved construction of oil seal especially adapted for use on the main rear bearing of the crank shaft of an internal combustion engine to function in conjunction with an oil slinger of the crank shaft and which provides an effective oil seal for use with a particular type of bearing cap and oil groove.

More particularly, it is an aim of the invention to provide a split oil seal adapted to be mounted on the outer wall of an oil groove outwardly of an oil slinger to afford an effective seal against the loss of oil.

Various other objects and advantages of the invention will hereinafter become more fully apparent from the following description of the drawing, illustrating a presently preferred embodiment of the invention, and wherein.

Figure 1:
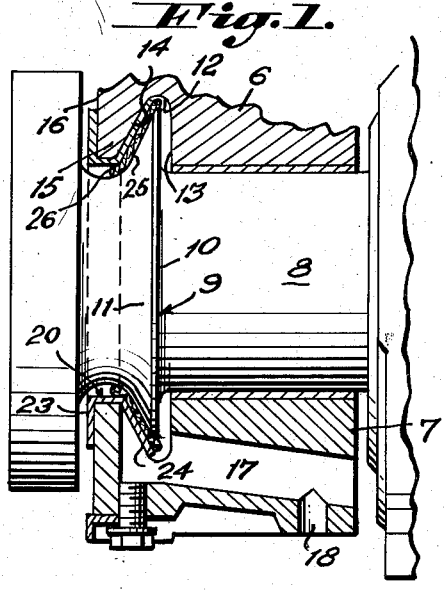
Figure 1 is a sectional view, partly in side elevation illustrating a conventional construction of a part of an automobile or other motor vehicle and showing the invention applied thereto.
Figure 2:
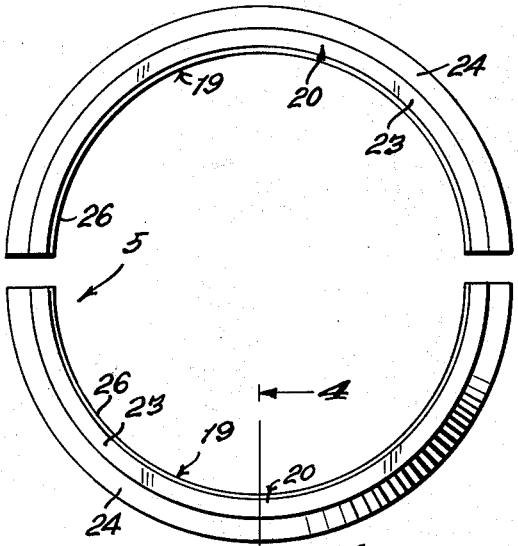
Figure 2 is a plane view of the two sections constituting the seal.
Figure 3:
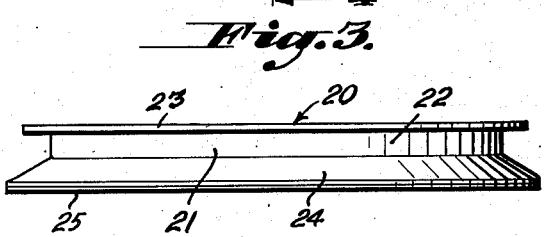
Figure 3 is an edge elevational view looking toward the outer side of one of the seal sections.

For the purpose of illustrating a preferred application and use of the oil seal, designated generally 5 and comprising the invention, a part of the block is illustrated at 6 and a part of the bearing cap is shown at 7. The parts 6 and 7 combine to form a bearing for an engine crank shaft 8 which is provided with an oil slinger, designated generally 9. The oil slinger 9 has an inner annular face 10 which is disposed substantially radially with respect to the shaft 8 and an outer annular inclined or beveled face 11. The parts 6 and 7 are recessed to provide an annular inwardly opening groove 12 in which the oil slinger 9 is loosely accommodated which has an inner substantial radial face 13 disposed opposite to the radial face 10 and an outer inclined face 14 which is disposed opposite and substantially parallel to the beveled face 11. The outer wall 15 of the groove 12 is partially defined by the inclined groove surface 14 and an outer wall surface 16 which is disposed substantially parallel to the surface 13 so that the wall 15 tapers in width in cross section in an inward direction, as illustrated in Figure 1. The bearing cap 7 is provided with an inclined bore 17 which communicates with the bottom of the groove 12 adjacent its upper end and which is provided adjacent its lower end with an outlet 18 in which one end of an oil return tube, not shown, is normally secured and which tube extends therefrom downwardly and into the vehicle crank case. The parts 6 to 18 are all of conventional construction and constitute no part of the present invention but have been illustrated and briefly described to afford a better understanding of the oil seal 5. Ordinarily, no seal is provided between the oil slinger 9 and the outer or rear wall 15 of the groove 12 and the present invention provides an effective oil seal for the wall 15 and which may be employed with the crank shaft 8 and oil slinger 9 without modification of any of the parts 6 to 18.

Figure 4:
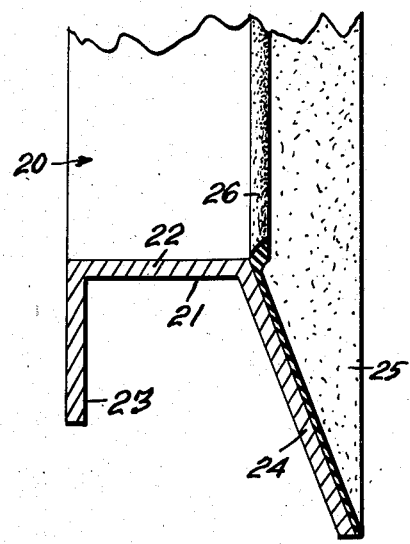
Figure 4 is a cross sectional view on an enlarged scale taken substantially along a plane as indicated by the line 4—4 of Figure 2.

The oil seal 5 is formed of two corresponding half circular sections 19 each including a semi-circular body portion 20 of channel-shaped cross section having an outwardly opening channel 21. The body portion 20 is formed of metal and includes a relatively wide bed portion 22, an outer wall 23 which extends substantially radially from one side edge of the bed portion 22 and an inner wall 24 which extends outwardly from the other side edge of the bed portion 22 in outwardly diverging relationship to the wall 23 and which is of a greater width than said wall 23, as best illustrated in Figure 4.

A sealing strip 25 of rubber or neoprene is vulcanized or otherwise suitably secured to the outer face of the inner wall 24 and extends from end-to-end thereof and from the inner to the outer edge of said wall 24. The sealing strip 25 is thickened as seen at 26 adjacent its inner edge and from end-to-end thereof and said thickened portion 26 extends inwardly to beyond the inner edge of the outer face of the inner wall 24 to provide a flange portion which is free to flex relatively to the body member 20.

The channel 21 is shaped to snugly receive therein the outer groove wall 15, as illustrated in Figure 1, with the outer wall 23 of the body 20 bearing against the outer surface 16 of the wall 15 and the inner wall 24 bearing substantially flush against the inclined groove surface 14. The bed portion 22 abuts against the inner edge of the wall 15. The outer wall 23 is preferably sufficiently resilient to yield outwardly when the body member is applied to the groove wall 15 so that a snug fitting engagement will exist between the body member 20 and the outer groove wall 15. With the seal sections 19 thus applied to the wall 15 the sealing strip 25 will bear against the beveled outer side 11 of the oil slinger 9 and its thickened flanged portion 26 will be turned outwardly by the slinger surface 11 and against the bed portion 22, as illustrated in Figure 1, so that the strip 25 will form an effective seal between the outer groove wall 15 and the beveled outer surface 11 of the oil slinger 9 to prevent any escape of oil outwardly between said parts. It will also be readily apparent that the seal 5 formed of the sections 19 is capable of being utilized with the parts 9 to 16 without any modification of said parts and without adversely affecting the operation of the oil slinger 9.

Various modifications and changes are contemplated and may obviously be resorted to, without departing from the spirit or scope of the invention as hereinafter defined by the appended claims.

We claim as our invention:

1. The combination with a crankshaft oil slinger having an annular beveled outer surface and a bearing having an inwardly opening annular groove accommodating the oil slinger including a beveled outer wall surface disposed in opposed relationship to the beveled surface of the oil slinger and defining one surface of an annular wall of the bearing, of an oil seal comprising an annular body member having an annular outwardly opening groove receiving therein said annular wall of the bearing, said body member including a bed portion, an outer wall projecting from said bed portion and bearing against an opposite surface of the annular wall of the bearing, said body member including an inner wall projecting outwardly from said bed portion and bearing against the beveled outer surface of the oil slinger receiving groove, and a sealing strip secured to the outer face of said inner wall of the body member and extending from end-to-end thereof and bearing against the beveled outer surface of the crank shaft oil slinger.

2. An oil seal as in claim 1, said sealing strip having a thickened unsupported inner edge portion extending inwardly from the bed portion of the body member and engaging between a portion of the outer beveled surface of the oil slinger and the bed portion of the body member.

3. An oil seal comprising, in combination with a crank shaft having an annular oil slinger extending outwardly from the periphery thereof including a beveled outer surface and a bearing in which the shaft is journaled having an annular inwardly opening groove accommodating the oil slinger including a beveled outer wall surface disposed in opposed relationship to the beveled outer surface of the oil slinger and defining the inner surface of an annular rear wall constituting the outer wall of said groove; an annular body member defining an annular outwardly opening groove in which said rear wall is snugly received including an outer wall bearing against the outer surface of said rear wall and an inner wall disposed in outwardly diverging relationship to said outer wall of the body member and disposed in said groove and against its beveled outer surface, said inclined inner wall being disposed substantially parallel to the beveled outer side of the oil slinger, and a sealing strip secured to the outer surface of said inclined inner wall of the body member and extending from end-to-end thereof and from its inner to its outer edge and against which said beveled outer surface of the oil slinger bears to provide a seal between said beveled outer surfac of the oil slinger and the inclined surface of the oil slinger receiving groove.

4. An oil seal as in claim 3, said sealing strip having a thickened inner edge extending beyond the inner edge of the outer surface of said inner wall of the body member and flared away from said inner wall and disposed in engagement with and compressed by a part of the oil slinger.

5. An oil seal as in claim 3, said oil seal being formed of corresponding semi-circular sections each including a semi-circular body member and a semi-circular sealing strip.

WILLIAM O. McINTYRE.
HAROLD V. LUNDQUIST.

REFERENCES CITED

The following references are of record in the file of this patent:

UNITED STATES PATENTS

| Number | Name | Date |
|---|---|---|
| 2,209,578 | Rainey et al. | July 30, 1940 |
| 2,366,765 | Anderson | Jan. 9, 1945 |
| 2,480,116 | Brummer | Aug. 30, 1949 |
| 2,542,141 | Horton | Feb. 20, 1951 |
| 2,558,183 | Kosetka | June 26, 1951 |

FOREIGN PATENTS

| Number | Country | Date |
|---|---|---|
| 637,097 | Germany | of 1936 |